United States Patent
Nick et al.

(10) Patent No.: US 9,964,130 B2
(45) Date of Patent: May 8, 2018

(54) METHOD FOR OPERATING A HYDRAULIC SYSTEM OF A SELF-PROPELLED PAVER, HYDRAULIC SYSTEM, ESPECIALLY FOR USING THE METHOD, AND PAVER WITH SUCH A HYDRAULIC SYSTEM

(71) Applicant: BOMAG GmbH, Boppard (DE)

(72) Inventors: Moritz Nick, Boppard (DE); Hermann Christ, Bubach (DE)

(73) Assignee: BOMAG GmbH, Boppard (DE)

( * ) Notice: Subject to any disclaimer, the term of this patent is extended or adjusted under 35 U.S.C. 154(b) by 457 days.

(21) Appl. No.: 14/639,377

(22) Filed: Mar. 5, 2015

(65) Prior Publication Data
US 2015/0252822 A1 Sep. 10, 2015

(30) Foreign Application Priority Data
Mar. 5, 2014 (DE) .......................... 10 2014 003 333

(51) Int. Cl.
| | | |
|---|---|---|
| *F16H 61/4165* | (2010.01) |
| *F15B 21/04* | (2006.01) |
| *F15B 11/08* | (2006.01) |
| *E01C 19/48* | (2006.01) |
| *F16H 61/4139* | (2010.01) |

(52) U.S. Cl.
CPC ............ *F15B 21/042* (2013.01); *E01C 19/48* (2013.01); *F15B 11/08* (2013.01); *F15B 21/041* (2013.01); *F16H 61/4139* (2013.01); *F16H 61/4165* (2013.01); *F15B 2211/20523* (2013.01); *F15B 2211/20546* (2013.01); *F15B 2211/6309* (2013.01)

(58) Field of Classification Search
CPC ............ F16H 61/4139; F16H 61/4165; F15B 21/042; F15B 11/09; F15B 21/041
USPC .................................. 60/490, 488, 487, 456
See application file for complete search history.

(56) References Cited

U.S. PATENT DOCUMENTS 4,395,878 A * 8/1983 Morita .................. B60W 30/18
180/307
2010/0293937 A1 11/2010 Ramm
(Continued)

FOREIGN PATENT DOCUMENTS

| | | |
|---|---|---|
| DE | 199 30 056 C1 | 1/2001 |
| DE | 10 2009 021 866 A1 | 11/2010 |

(Continued)

OTHER PUBLICATIONS

Espacenet, English Machine Translation of DE1993005601, published Jan. 25, 2001, retrieved from http://worldwide.espacenet.com on Mar. 4, 2015 (9 pages).
(Continued)

*Primary Examiner* — F. Daniel Lopez
*Assistant Examiner* — Daniel Collins
(74) *Attorney, Agent, or Firm* — Wood Herron & Evans LLP (57) ABSTRACT

The present invention relates to a method for operating a hydraulic system of a self-propelled road paver, in particular, for the supply of hydraulic oil as needed to a closed hydraulic circuit of the road paver, a hydraulic system of a road paver for performing the method and a road paver having such a hydraulic system. The extraction and/or return of the quantity of hydraulic oil occur depending on at least one operating parameter of the road paver.

16 Claims, 2 Drawing Sheets

(56) References Cited

U.S. PATENT DOCUMENTS

2011/0126533 A1* 6/2011 Noll ................. B60W 10/06
   60/431
2012/0317964 A1* 12/2012 Demick ............... F16D 31/00
   60/327

FOREIGN PATENT DOCUMENTS

| DE | 10 2011 018 469 A1 | 10/2012 | | |
|----|---|---|---|---|
| EP | 0691234 A | * | 1/1996 | ............. B60K 17/10 |
| EP | 2 333 157 A1 | 6/2011 | | |
| EP | 2 613 058 A2 | 7/2013 | | |

OTHER PUBLICATIONS

Espacenet, English Machine Translation of EP2613058A2, published Jul. 10, 2013, retrieved from http://worldwide.espacenet.com on Mar. 4, 2015 (18 pages).
Espacenet, English Machine Translation of DE102011018469A1, published Oct. 25, 2012, retrieved from http://worldwide.espacenet.com on May 15, 2015 (12 pages).

* cited by examiner

Fig. 2

METHOD FOR OPERATING A HYDRAULIC SYSTEM OF A SELF-PROPELLED PAVER, HYDRAULIC SYSTEM, ESPECIALLY FOR USING THE METHOD, AND PAVER WITH SUCH A HYDRAULIC SYSTEM

CROSS-REFERENCE TO RELATED APPLICATIONS

The present application claims priority under 35 U.S.C. § 119 of German Patent Application No. 10 2014 003 333.3, filed Mar. 5, 2014, the disclosure of which is hereby incorporated herein by reference in its entirety.

FIELD OF THE INVENTION

The present invention relates to a method for supplying hydraulic oil to a closed hydraulic circuit of a self-propelled road paver. The present invention further relates to a hydraulic system (hydraulic circuit), especially for using this method, and to a road paver with such a hydraulic system. The hydraulic system of the paver comprises at least one closed hydraulic circuit (hydraulic circuit) having at least one operating pump and at least one hydraulic motor.

BACKGROUND OF THE INVENTION

Hydraulic motors in a closed hydraulic circuit, and, in particular, in a respective one thereof, are used in many self-propelled road pavers for the travel drive and further drives. The hydraulic motors are pressurized with hydraulic oil by hydrostatic pumps (designated below as operating pumps for the purpose of better distinguishability), which in turn are driven by an internal combustion engine, for example. The term operating pump thus designates in the present case a hydraulic pump which conveys the hydraulic oil within a closed hydraulic circuit for driving a consumer. A specific quantity of the hydraulic oil is usually taken from the circuit per unit of time for the exchange of hydraulic oil (for example, for cooling or cleaning purposes) in the closed circuit, which quantity is replaced at another location by a cooled and filtered hydraulic oil, so that the total quantity of the hydraulic oil in the closed hydraulic circuit ideally remains approximately constant. This process is known in the present case as scavenging. The supply of the hydraulic oil to the closed hydraulic circuit during the scavenging process usually occurs by means of constant pumps with a constant volumetric displacement. The pump output is configured in such a way that during the operation of the circuit under loading of the hydraulic motors and simultaneously at a low hydraulic oil flow rate, i.e., at low speed of the internal combustion engine, an oil supply is ensured which is sufficient for the compensation of the hydraulic oil volume taken from the closed hydraulic circuit per unit of time. In order to ensure an oil supply which is adequate over the entire operating spectrum, the delivery rate of the constant pump is therefore always designed for oversupply of the circuit with hydraulic oil, wherein excess amounts are lost as power losses. This produces unnecessary consumption of fuel. Furthermore, problems frequently occur during starting, especially during cold starting of the internal combustion engine, because the produced drag loads are very high. A generic road paver is known, for example, from DE 10 2011 018 469 A1.

The present invention is based on the object of providing a method, a hydraulic system and a road paver of the kind mentioned above with which the fuel consumption of the internal combustion engine can be reduced and at the same time the required dragging power can be reduced, especially during cold starting.

SUMMARY OF THE INVENTION

This object is achieved by the method for the operation of a hydraulic system of a self-propelled road paver in such a way that the quantity of hydraulic oil supplied to the closed hydraulic circuit per unit of time is controlled and occurs with respect to the quantity as needed, in particular, depending on at least one operating parameter of the road paver. The relevant aspect of the present invention is thus that an excessive feeding quantity of hydraulic oil is no longer provided at all times as before, but that the feeding rather occurs as needed and is adjusted to the respective operating situation. The pump which is responsible for the feeding process and which directly or indirectly supplies a quantity of hydraulic oil to the closed hydraulic circuit which substantially corresponds to the taken quantity of hydraulic oil is designated in the present case as a feed pump. It is ideal if the quantity which is taken from the closed hydraulic circuit and returned or supplied thereto is also controlled and changed depending on at least one operating parameter of the road paver. It is possible to resort to at least one suitable individual operating parameter for the closed-loop control of the extraction quantity and/or the feed quantity for each operating state. This entire package allows adjusting and adapting the hydraulic oil volume scavenged per unit of time during the whole operating process to the respectively current operating circumstances depending on at least one operating parameter. Power losses by excessive scavenging processes are thus reduced drastically and the efficiency in the operation of the hydraulic circuit, in particular, concerning fuel consumption, is improved. If the at least one consumer which is driven by the operating pump in the closed hydraulic circuit, which is typically a hydraulic motor, is not required at a specific time during the operation of the paver, there is no extraction/feeding or at least a very low level thereof, because in this case no scavenging of a partial quantity of the hydraulic oil situated in the closed hydraulic circuit is necessary. It is preferable if a low amount of scavenging (minimum scavenging) occurs at all times. However, such scavenging is considerably lower than the scavenging occurring during the operation. If the consumer driven by the closed hydraulic circuit is used, the scavenging process and thus the quantity of the hydraulic oil taken from and supplied to the closed hydraulic circuit per unit of time is regulated upwardly depending on the load and is adjusted to the individual operating conditions. This generally provides a considerably higher level of efficiency concerning the entire scavenging and feeding process. Furthermore, the starting behavior of the road paver, especially during cold starting, is improved considerably. It is thus an essential aspect of the present invention that a feed pump arranged as a variable displacement pump, especially with variable delivery rate, is used according to the method for oil supply to the closed hydraulic circuit, wherein the current delivery rate of the feed pump is controlled (pressure-controlled) as required on the basis of an operating parameter, for example, a fixed feed pressure, specifically by means of a pressure controller, for example. The delivery rate of the feed pump is varied in the manner, for example, that even in different operating situations the pressure within a feed line to the closed hydraulic circuit and/or at the output of the feed pump is kept at a determined target pressure value. If, therefore, the pressure at the reference point decreases, for example, the delivery rate of the feed pump is increased and vice versa. As a result, the feed pump only conveys such a quantity of hydraulic oil for feeding as is specifically required in the specific operating situation. The efficiency of this process can thus be improved considerably.

In order to enable an independent and reliable cooling and/or lubrication of the at least one operating pump and/or the at least one hydraulic motor of the closed hydraulic circuit simultaneously to the closed-loop control of the scavenging process by means of the controllable feed pump as required, a scavenging circuit with a scavenging pump arranged as a constant pump (which is also designated below as a cooling or lubricating pump) is further provided according to the present invention, via which, independently of the closed hydraulic circuit. A continuous scavenging and/or cooling of the at least one operating pump and/or the at least one hydraulic motor for cooling and/or lubricating purposes occurs independently of the at least one operating parameter. In contrast to the variable displacement pump, the constant pump is characterized in that it conveys a constant oil volume per unit of time. The constant pump thus conveys hydraulic oil, in particular, independently of the current operating state of the operating pump in the closed hydraulic circuit. As a result, the operating pump of the closed hydraulic circuit is simultaneously cooled and lubricated by a separate cooling and lubricating system, independently of the extraction and feeding of hydraulic oil from and to the closed hydraulic circuit, in that hydraulic oil is pumped through the operating pump, for example, through the interior of its housing, by means of the scavenging pump arranged as a constant pump. The hydraulic oil used for this purpose is not supplied to the closed hydraulic circuit during this process and must therefore be distinguished from the scavenging process as mentioned above. Instead, it is supplied to and removed from the operating pump and/or the hydraulic motor via additional connections, for example, on the housing of the operating pump and/or on the hydraulic motor. This process is designated in the present case as cross-scavenging of the operating pump/hydraulic motor of the closed hydraulic circuit. It is ensured by using a constant pump as a scavenging pump that sufficient cooling and lubrication of the operating pump and/or the hydraulic motor of the at least one closed hydraulic circuit will also occur at all times when there is no feeding of hydraulic oil to the closed hydraulic circuit. At the same time, the scavenging pump can be arranged as a comparatively low-power and small unit, because it is exclusively required for the process of cross-scavenging. In the total balance, this also allows performing the method according to the present invention in an especially efficient manner.

The at least one operating parameter for the closed-loop control of the feed pump is preferably determined currently and an actuating quantity for extracting and/or supplying the hydraulic oil is calculated on the basis of a predetermined algorithm. Alternatively, the actuating quantity, for example, a signal to a proportional valve, can be determined from the comparison of the currently determined operating parameter with predetermined characteristic quantities. The relevant aspect is that the extent of hydraulic oil extraction from and/or hydraulic oil supply to a closed hydraulic circuit is coupled to at least one operating parameter. Such an operating parameter can be the temperature of the hydraulic fluid and/or the pressure conditions in the hydraulic circuit etc, as will be explained below in closer detail. As a result of this closed-loop control of the extraction and feeding of hydraulic fluid for scavenging purposes from the closed hydraulic circuit as required, the quantity, and specifically the scavenged volume, of hydraulic fluid per unit of time can be adjusted to the respective operating conditions and be optimized. It can be specifically provided for performing the method, for example, that the closed-loop control of the delivery rate of the feed pump occurs depending on the load pressure, for example, on the basis of the pressure of the hydraulic oil in a load signal line, and the pressure of the hydraulic oil is monitored in this region, especially within the pump (i.e., within a structurally coherent pump module). A decrease in the pressure in the return line leads to an increased delivery rate of the feed pump and vice versa.

For the method according to the present invention, it is preferred that the quantity of hydraulic oil taken from the closed hydraulic circuit and the hydraulic oil in the scavenging circuit exiting downstream of the at least one operating pump and/or the at least one hydraulic motor are joined in a common collector and are supplied to a common tank, especially via a common cooler. The circuits for the scavenging and the cross-scavenging are thus joined downstream of the closed hydraulic circuit and downstream of the at least one operating pump and/or the at least one hydraulic motor, and subsequently supplied preferably together to a cooler, if necessary. As a result, the total configuration of the hydraulic system provided for performing the method according to the present invention can be simplified.

It is preferred in a further preferred refinement of the method according to the present invention if a division of the hydraulic oil conveyed by the constant pump occurs downstream of the constant pump in the scavenging circuit among operating pumps and/or hydraulic motors of at least two closed hydraulic circuits, wherein hydraulic oil is returned independently of this to both closed hydraulic circuits in a controlled manner as needed. This refinement offers the advantage that the hydraulic oil required for cross-scavenging for the entire hydraulic system of the paver, which typically comprises several closed hydraulic circuits, is conveyed centrally by the one scavenging pump. The total configuration of the hydraulic system can thus be simplified in combination with a simultaneously more efficient operating mode. The distributor is characterized in that it comprises a single feed for the hydraulic oil conveyed by the scavenging pump and at least two discharges. Such a central distributor is further advantageous for maintenance reasons.

With respect to the apparatus, the present invention is based on a generic hydraulic system (which is also known as a hydraulic circuit) of a road paver, comprising at least one closed hydraulic circuit with at least one operating pump and at least one consumer driven by said pump, especially a hydraulic motor, wherein a quantity of hydraulic oil is taken from the closed hydraulic circuit in operation per unit of time for cooling and/or filtering purposes and a quantity of hydraulic oil is resupplied at another point per unit of time, and wherein the supply occurs via a feed pump supplied from a tank with hydraulic oil. According to the present invention, the hydraulic system of the paver is preferably arranged for performing the method according to the present invention. It is now relevant for achieving the object that the hydraulic system (also designated as hydraulic circuit) is arranged in such a way that the extent of the scavenging process, i.e., the quantity of hydraulic oil exchanged or taken from and returned to the at least one closed hydraulic circuit per unit of time, is variably adjusted to the respective operating situation. For this purpose, provision is made for the feed pump to be a variable displacement pump with variable delivery rate, the delivery rate of which is controlled as required by means of at least one operating parameter, such that it supplies hydraulic oil to the hydraulic circuit as needed. It is thus ensured that for the scavenging process only such an amount of hydraulic oil is conveyed as is currently required for the respective operating situation. Simultaneously, provision is made according to the present invention for the hydraulic system to comprise a scavenging pump arranged as a constant pump, which conveys hydraulic oil to a scavenging circuit independently of the feed pump, especially in a constant manner, wherein the scavenging circuit is arranged in such a way that the at least one operating pump and/or the at least one hydraulic motor is scavenged and/or cooled by said circuit with hydraulic oil, independently of the operation of the feed pump. The scavenging circuit is independent of the closed hydraulic circuit. For this purpose, the hydraulic oil of the scavenging circuit is guided through the housing of the at least one operating pump and/or the at least one consumer, but not in or through the lines of the closed hydraulic circuit. From a flow standpoint, the scavenging circuit thus extends independently of and "transversely" to the closed hydraulic circuit and does not fulfill any drive function for a consumer such as, for example, a hydraulic motor. This configuration ensures that the at least one operating pump and/or the at least one hydraulic motor are subjected to a substantially continuous cooling and/or lubrication, independently of the operating state of the hydraulic system and, in particular, independently of the operating state of the feed pump. It is important that the scavenging pump is not affected by the closed-loop control of the feed pump and is operated independently of said control. At the same time, the scavenging pump can be arranged in a comparatively small, low-powered and compact manner, because it is provided for this one task alone. As a result, the power demand for the scavenging process can thus be kept at a comparatively low level.

Preferably, the closed hydraulic circuit comprises a scavenging or outlet aperture and a pressure-maintaining valve which is, in particular, situated downstream of the scavenging aperture in the direction of flow. The scavenging aperture designates an aperture in a line branch in the closed hydraulic circuit via which hydraulic oil can be taken from said circuit. The pressure-maintaining valve ensures that the low pressure in the closed hydraulic circuit is kept at a desired level. A proportional valve is preferably provided downstream of the pressure-maintaining valve, which proportional valve is triggered depending on the operating parameter, so that the valve opening cross-section and thus the quantity of hydraulic oil taken from the circuit and returned to the hydraulic oil tank depends on the operating parameter and can be varied. The proportional valve can also be designated a continuous valve. The extraction volume of the hydraulic oil from the closed hydraulic circuit per unit of time can be controlled via this arrangement.

According to the present invention, in particular, the supply of hydraulic oil to the hydraulic circuit is controlled as needed. For this purpose, provision is specifically made for a variable displacement pump as a feed pump, whose central core feature is that it has a variable delivery rate, i.e., a variable volumetric displacement per unit of time. Such a variable displacement pump can be an axial piston pump, for example. The delivery rate can be changed, for example, by changing the revolutions of the pump drive per minute and/or by changing the suction volume of the feed pump. The closed-loop control of the delivery rate of the feed pump preferably occurs at least indirectly by means of the extraction quantity of hydraulic fluid from the closed hydraulic circuit, for example, for cooling and filtering purposes, and is thus also controlled by means of an operating parameter, which however, in particular, is a different operating parameter than the one used for controlling the proportional valve. An operating parameter which is especially suitable for the closed-loop control of the delivery rate of the feed pump can be a target pressure value at the output of the feed pump or a pressure value determined within a feed line. An operating parameter that can be used for controlling the proportional valve can be the temperature of the hydraulic oil in the closed hydraulic circuit, for example. This overall configuration generally allows controlling the scavenging of hydraulic oil occurring in the operation of the closed hydraulic circuit, both with respect to the extraction quantity of hydraulic oil per unit of time from the closed hydraulic circuit and also with respect to the feed quantity of hydraulic oil per unit of time to the closed hydraulic circuit as needed, so that power losses can be minimized in this manner. The scavenging pump and the scavenging circuit supplied by said pump additionally ensure that sufficient cooling and lubrication of the movable parts of the pump in the hydraulic closed circuit is ensured, even in the case of low feeding by the feed pump. This cooling and lubricating pump, which is arranged as a constant pump, pumps via a separate cooling and lubricating line a continuous, preferably constant, volume flow of hydraulic oil via separate connections through the interior of the housing, for example, especially transversely to the fluid flow of the closed hydraulic circuit. This cooling and lubricating line is not directly connected to the closed hydraulic circuit, in other words, the operating pump is cross-scavenged avoiding the pressure or hydraulic oil in the closed hydraulic circuit, so that cooling and lubrication of the operating pump can be realized with a substantially lower energy input in comparison with feeding a respective minimum quantity by the feed pump.

The present invention offers the advantage that, in particular, the supply to the closed hydraulic circuit occurs as needed, so that the efficiency of the road paver is optimized. Any excess quantity of hydraulic oil, which is always present in the prior art and is converted into power losses, will be avoided. Whereas conventional constant-flow pumps, when used for supplying hydraulic oil to a closed hydraulic circuit, always supply more oil than is actually necessary for feeding, for example, the feed pump which is controlled as needed according to the present invention only supplies the oil quantity for which there is an actual demand and which is also supplied. In addition, due to the operating pump being cooled and lubricated by means of a separate cooling and lubricating pump independently of the supply, a minimum feeding quantity of the feed pump can be prevented, which would otherwise be required for the basic supply of the operating pump with cooled hydraulic oil for cooling and lubricating purposes. In combination with an extraction of hydraulic fluid from the closed hydraulic circuit which is controlled depending on at least one operating parameter, it is thus possible to achieve a highly optimized overall system for controlling the scavenging process of hydraulic fluid from a closed hydraulic circuit, in particular, for cooling and filtering purposes.

It is especially advantageous that the at least one operating parameter is currently determined, and an actuating quantity for the closed-loop control of the extraction of the hydraulic oil and/or an actuating quantity for the closed-loop control of the volumetric displacement of the feed pump are calculated therefrom on the basis of a predetermined algorithm. It may alternatively be expedient that the actuating quantity is derived from a comparison of the currently determined operating parameter with predetermined characteristic quantities. A closed-loop control system is thus obtained, for example, in which the quantity of hydraulic oil taken from the closed hydraulic circuit per unit of time controls the quantity of hydraulic oil to be fed per unit of time.

Securing of the at least one closed hydraulic circuit can preferably be achieved by monitoring the pressure of the resupplied hydraulic oil.

The proportional valve can be triggered in an especially simple manner in that it comprises a control input on the basis of an electrically actuatable magnet, a wax expansion element or a bimetallic element.

Since especially the temperature of the hydraulic oil is critical, in particular, in the at least one closed hydraulic circuit, it is advantageous if the at least one operating parameter is determined via a temperature sensor, and the proportional valve is triggered by an electronic control unit (ECU). The relevant operating parameter is then accordingly the temperature of the hydraulic oil. It can be determined within the closed hydraulic circuit or especially also in the flow direction of the hydraulic oil behind the outlet of the extracted hydraulic fluid from the respective unit, especially a motor. The control of the delivery rate of the feed pump occurs on the other hand especially depending on a pressure reference value, for example, in a feed line to the closed hydraulic circuit.

A particularly large number of operating conditions of the road paver can be monitored in that several operating parameters are derived from a motor control device or a machine control unit for evaluation in the electronic control unit (ECU), and that the proportional valve is triggered by the electronic control unit (ECU).

It is expedient that a data memory is present in which characteristic quantities of the at least one operating parameter are stored for comparison with the current operating parameter, and that they are supplied to the electronic control unit (ECU) for determining an actuating quantity for the extraction of the hydraulic oil.

According to a preferred refinement of the present invention, several closed hydraulic circuits are present and each circuit is controlled separately. If several circuits are controlled individually in this manner, especially good efficiency of the road paver can be achieved. The at least two closed hydraulic circuits of the road paver are operated independently from each other, for example, in order to fulfill different machine functions. The at least two hydraulic circuits are thus arranged in parallel with respect to the scavenging process, for example, but not in series. It is now preferable in this connection if the supply of hydraulic oil as needed to the several closed hydraulic circuits occurs jointly by the feed pump arranged as a variable displacement pump, wherein a distributor is provided downstream of the feed pump via which the supply of the hydraulic oil to the several closed hydraulic circuit occurs. The essential aspect of this refinement of the present invention is thus that a separate feed pump is not associated with each of the at least two closed hydraulic circuits. Instead, the one feed pump rather provides the hydraulic oil required for the feeding process jointly for the at least two closed hydraulic circuits, which occurs in each case as needed. For this purpose, the division of the hydraulic oil conveyed by the feed pump occurs downstream of the pump in the distributor, whose task is dividing the flow of the hydraulic oil coming from the feed pump among the at least two closed hydraulic circuits, according to the respective demand. Such a distributor can be a distributing block, for example, having an inlet for the hydraulic oil coming from the feed pump and several outlets for connection to the at least two closed hydraulic circuits.

In an especially preferred embodiment, provision is made for a respective closed hydraulic circuit for the travel drive on the right side and/or for the travel drive on the left side and/or for a scraper belt on the right side and/or for a scraper belt on the left side and/or for a screw conveyor on the right side and/or for a screw conveyor on the left side and/or a tamper drive and/or for the drive of a vibrating apparatus.

In order to simplify the overall configuration of the hydraulic system of the road paver according to the present invention, it is preferable if the feeding and scavenging circuit and the cross-scavenging circuit outside of the closed hydraulic circuit are not completely separated from each other. It is specifically preferable if a collector is present via which the quantity of hydraulic oil taken from the at least one closed hydraulic circuit and the quantity of hydraulic oil conveyed by means of the scavenging pump through the at least one operating pump and/or the at least one hydraulic motor are joined and preferably supplied to a common tank, from which the feed pump and the scavenging pump respectively take hydraulic oil. The collector is a component with several inlets, via which hydraulic oil from the scavenging process and from the extraction from the closed hydraulic circuit is supplied thereto, and a single common outlet via which the combined quantities of hydraulic oil are especially supplied to a respective tank. The advantage of this embodiment is that the overall number of the conduits required for the hydraulic oil can be reduced.

It is principally possible that the collector conducts the hydraulic oil directly to a tank or completely through a cooler at first and subsequently to a tank. It is preferable however if a cooling bypass line is present downstream of the collector, via which the hydraulic oil emitted from the collector can be supplied at least partly to a cooler upstream of the collecting tank and/or before the feed pump. This arrangement offers the advantage that it allows a highly precise setting of the temperature of the hydraulic oil and prevents excessive cooling and simultaneously provides the required cooling. The system can thus be brought rapidly to operating temperature.

A large number of different variants can principally be used for the specific configuration of the feed pump. The essential aspect is that the feed pump provides a variable volumetric displacement per unit of time and the setting of the specific volumetric displacement in operation is varied and adjusted depending on at least one operating parameter, especially with the goal of ensuring a constant pressure level at the pump output. A variation in the delivery rate preferably occurs via a change in the volume of the internal space of a delivery cylinder. The feed pump ideally comprises a pressure controller for the control of the delivery rate as needed, for example, which pressure controller is arranged for setting the operating pressure of the feed pump at its output within a control range. The pressure controller is arranged in the manner that it increases the delivery rate of the feed pump when the pressure decreases and vice versa. The relevant aspect for pressure regulation can be the pressure, for example, at the pump output in the output line. The pressure controller can further form a common module with the feed pump, especially surrounded by a common housing.

In a further aspect, the present invention relates to a road paver with a hydraulic system (hydraulic circuit) as described above. Such a road paver is thus also part of the present invention. Such road pavers usually comprise several closed hydraulic circuits existing in parallel for the operation of different consumers such as travel drives, tamping beams, drives for the distributor screws, drives for conveying devices, drives for vibration devices etc. The advantages of the hydraulic system according to the present invention show particularly clearly in this case.

It is, therefore, also preferable for a road paver according to the present invention if it comprises at least two closed hydraulic circuits, each having at least one respective operating pump and at least one respective hydraulic motor, wherein a distributor is present downstream of the scavenging pump which allocates the hydraulic oil conveyed by the scavenging pump in parallel to the at least one respective operating pump and/or the at least one hydraulic motor of the two hydraulic circuits. The essential aspect of this refinement of the present invention is that several closed hydraulic circuits are present, via which consumers can be driven independently of each other. However, the cross-scavenging occurs simultaneously from a central point by means of the one scavenging pump. In addition, or alternatively, the individual supply to the at least two closed hydraulic circuits may also occur via a common feed pump. Both measures facilitate the overall construction of the road paver.

If there are at least two closed hydraulic circuits with a respective operating pump, the at least two operating pumps are preferably combined as a modular unit. This allows a compact overall configuration. It is preferable at the same time however if the at least two operating pumps comprise separate inputs and outputs for the hydraulic oil conveyed by the scavenging pump for scavenging and/or cooling purposes.

Road pavers according to the present invention preferably comprise a plurality of hydraulic consumers such as a tamping screed, a right travel drive and a left travel drive, right and left drives for screw conveyors, right and left drives for scraper belts, drives for vibration devices, etc., each having a respective closed hydraulic circuit. The more consumers there are in hydraulic circuits, the clearer the potential increases in efficiency will show. It is also important that the arrangement of the method, the hydraulic system and the road paver according to the present invention offers optimal possibilities to take into account the different requirements of the individual hydraulic consumers during the paving process and the transport travel, when the operating devices are not required, with respect to the extent of the scavenging process in operation. For example, no scavenging, or only very little scavenging, of the closed hydraulic circuits that drive the operating devices is necessary during transport travel, whereas in paving operation the scavenging of the closed hydraulic circuits of the travel drive motors is clearly less relevant as compared to the operating devices with respect to the required extent thereof.

BRIEF DESCRIPTION OF THE DRAWINGS

The present invention will be explained in more detail below by reference to an exemplary embodiment shown in the drawings. In the schematic drawings.

DETAILED DESCRIPTION OF THE INVENTION

Figure 1:
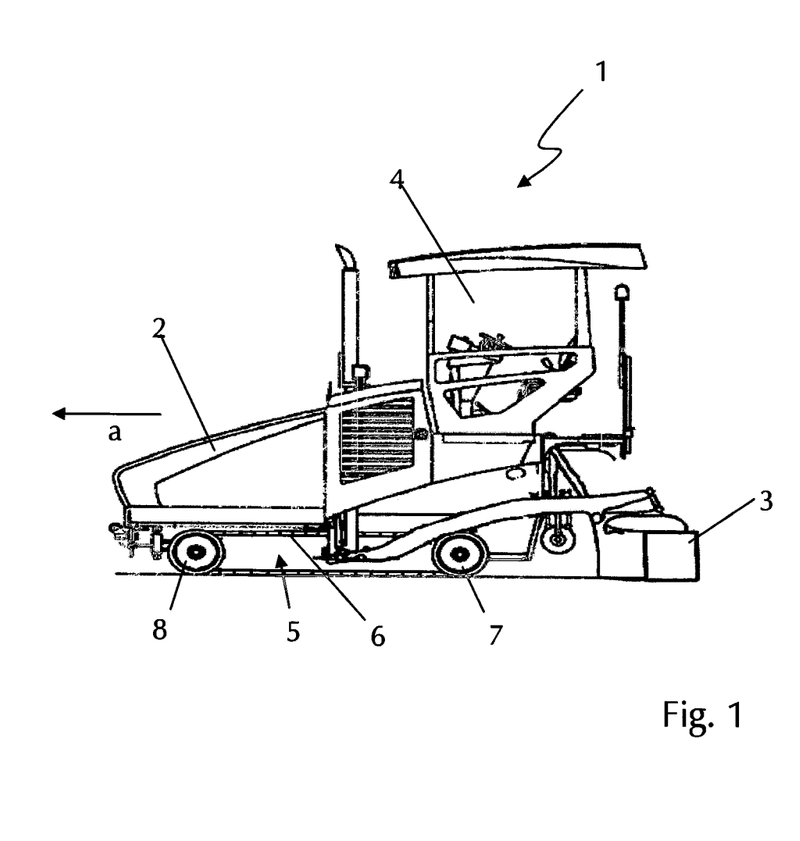
FIG. 1 shows a side view of a road paver.

FIG. 1 shows a self-propelled road paver 1. The forward travelling direction is designated with arrow a. The road paver 1 comprises a material bunker 2 in the front region for accommodating paving material, and a paving or smoothing screed 3 in the rear region. An operator platform is designated with reference numeral 4. The road paver 1 comprises a running gear arranged as a crawler gear 5 with a crawler on the right side and on the left side, wherein only the crawler on the left side is shown in FIG. 1. Each crawler comprises a track 6 and a drive wheel 7 and a deflecting wheel 8. A wheel-type running gear is also possible as an alternative.

Figure 2:
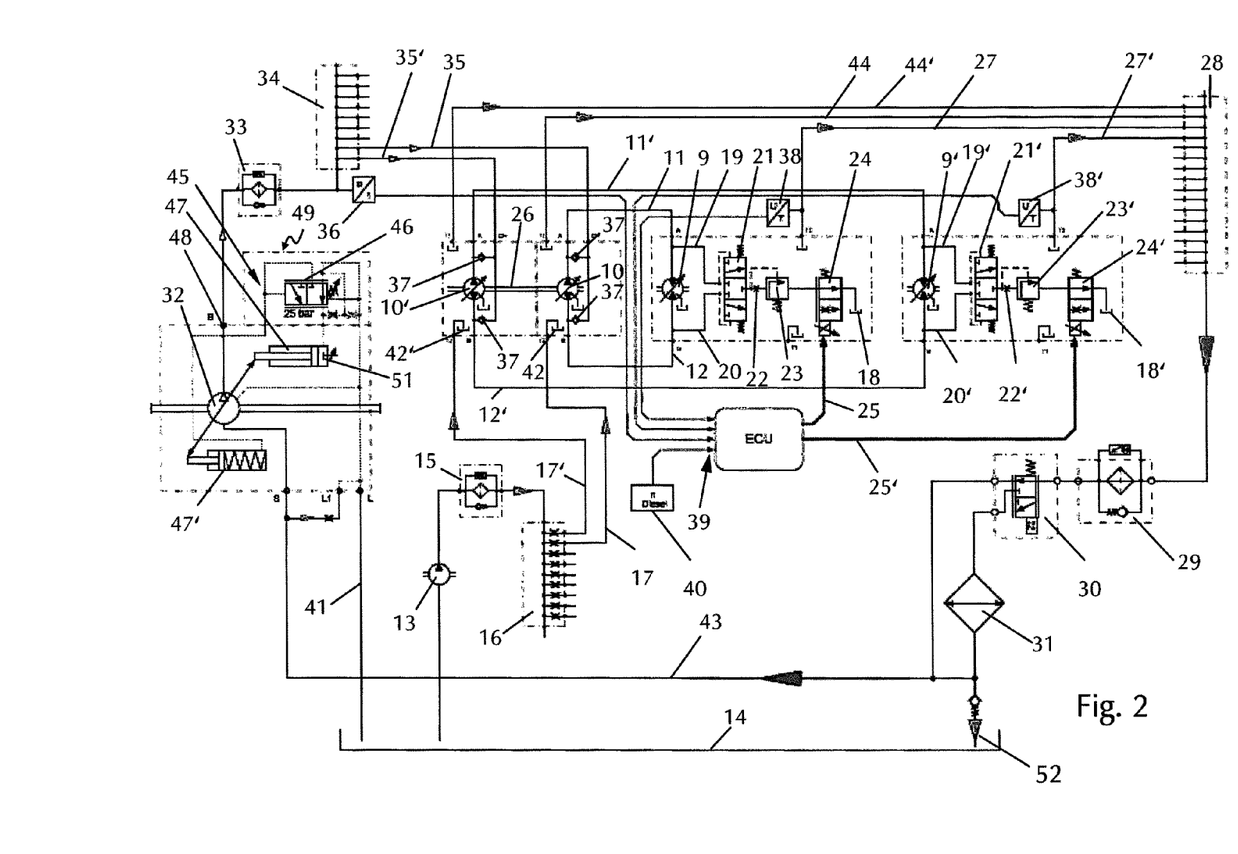
FIG. 2 shows a hydraulic circuit diagram of a travel drive of the road paver of FIG. 1.

The road paver 1 is provided with a diesel engine as the main drive unit (not shown), by means of which the pumps of a hydraulic travel drive (FIG. 2) and further pumps for hydraulic actuators and drives (not shown) are driven. FIG. 2, which shows details concerning the configuration of the hydraulic system, thus only shows a section of the overall hydraulic system.

As shown in FIG. 2, the travel drive comprises first closed hydraulic circuit with a first hydraulic motor 9 and a first operating pump 10 for conveying the hydraulic oil in the first circuit. The first hydraulic motor 9 is used for driving the crawler gear (which can also be a wheel) on one side of the road paver, for example, the drive wheel 7 on the left side. The first circuit comprises a first and second operating line 11, 12 for connecting the first hydraulic motor 9 to the first operating pump 10 and for producing the closed hydraulic circuit.

The first operating line 11 is connected via a first discharge line 19 to a first scavenging valve 21, and the second operating line 12 is connected via a second discharge line 20 to the first scavenging valve 21. The output of the first scavenging valve 21 is connected via a first scavenging aperture 22 to a first spring-loaded pressure maintaining valve 23.

A first proportional valve 24, which can be controlled electromagnetically and whose output opens into the interior 18 of the housing of the hydraulic motor 9, is present at the output of the first pressure-maintaining valve 23. The control input of the first proportional valve 24 is connected via a first control line 25 to one of several outputs of an electronic control unit ECU, which is supplied on the input side with different operating parameters of the road paver 1 and the travel drive, in particular.

The control unit ECU can be arranged as a separate control device. The function of the control unit ECU can also be assumed alternatively by a control unit which additionally controls further functions of the road paver 1.

The control unit comprises analog and digital inputs 39 for sensors, which in this case are arranged, for example, as a pressure sensor 36 and as temperature sensors 38, 38', the pressure sensor being connected via a load signal line to a hydraulic oil line between the feed pump 32 and the collecting block 34.

Furthermore, interfaces to a bus system are present, for example, to a motor control device, the machine control of the road paver 1 and to I/O interfaces (not shown). A temperature sensor 38 for the temperature of the scavenged hydraulic oil is arranged in the first return line 27.

As shown in FIG. 2, the travel drive comprises a second closed hydraulic circuit which is arranged in a substantially identical manner in relation to the first circuit. It is accordingly provided with a second hydraulic motor 9', a second pump 10', third and fourth operating lines 11', 12', a second housing interior 18', third and fourth discharge lines 19', 20', a second scavenging valve 21', a second scavenging aperture 22', a second spring-loaded pressure-maintaining valve 23', a second temperature sensor 38', and a second proportional valve 24'. The second hydraulic motor is used for driving the other crawler or the other drive wheel of the travel drive. The entire hydraulic system of the road paver 1 further comprises additional closed hydraulic circuits (not shown in detail), for example, for a scraper belt on the right side and/or for a scraper belt on the left side and/or for a screw conveyor on the right side and/or for a screw conveyor on the left side and/or for a tamper drive and/or for the drive of a vibration apparatus, which are connected to the entire system shown in FIG. 2.

The control input of the second proportional valve 24' is connected via a second control line 25' to a further output of the electronic control unit ECU. The first and the second proportional valve 24, 24' can be triggered separately and independently via the control unit ECU.

The road paver of FIG. 1 generally comprises further closed hydraulic circuits which are arranged in an essentially corresponding manner and via which further hydraulic consumers such as a tamping beam can be driven. These further closed hydraulic circuits are not shown in FIG. 2 only for reasons of clarity of the illustration.

The first and the second operating pump 10, 10' are connected in the present embodiment as a tandem pump, which jointly form a common modular unit, to a common drive shaft 26, which is driven by the diesel engine via a pump transfer gear (not shown). Alternative arrangements can principally also be used in this case.

A quantity of hydraulic oil, which depends on one of the operating parameters which are supplied to the control unit ECU, is taken from the two closed hydraulic circuits via the proportional valves 24, 24' which are controlled by the control unit ECU. These operating parameters include the oil temperature and the feed pressure of the first and the second circuit and the speed of the diesel engine which is derived from a motor control unit 40. The need for hydraulic oil to be currently scavenged in the first and second circuit is derived therefrom in the control unit ECU for each operating point.

Since the control unit ECU triggers the first and second proportional valve 24, 24', the scavenging quantities of the hydraulic oil are determined by the opening cross-section of the proportional valves 24, 24'. The scavenging quantities are therefore dependent on the operating parameters which are supplied to the control unit ECU and are evaluated there. The lower the temperature or the speed of the diesel engine, for example, the less need for scavenging, and the scavenging is accordingly kept at a correspondingly low level. This accordingly also results in a lower feeding quantity per unit of time.

The oil quantities to be returned, which are necessary for the feeding in the scavenging process as needed, are controlled for the first circuit by means of a control circuit 49. It comprises a pressure-regulated feed pump 32 which supplies oil to the first or second operating lines 11, 12 depending on the conveying direction and thus supplies the first circuit as needed with the oil quantity required according to the respective operating conditions. The supply respectively occurs via a check valve.

The feed pump 32 is provided with a pressure controller 45 which limits the maximum pressure at the output of the feed pump 32 within the control range of the feed pump 32. The pressure controller 45 consists of a pressure valve 46 and a first and second hydraulic actuating cylinder 47, 47' which set the operating pressure of the feed pump 32. The operating output 48 of the feed pump 32 is connected to the control input and one of the two inputs of the pressure valve 46 and the spring-loaded actuating chamber of the second actuating cylinder 47'. The output of the pressure valve 46 is connected to the pressure chamber 51 of the first actuating cylinder 47. In a first control position of the pressure valve 46, it connects the operating output 48 of the feed pump 32 with the pressure chamber 51 of the first actuating cylinder 47, and it interrupts this connection in a second control position.

The feed pump 32 thus only conveys pressure liquid to such an extent as is currently required for the scavenging in operation. If the operating pressure exceeds a pressure target value set on the pressure valve 46, the feed pump 32 will regulate towards a lower displacement volume. The pressure target value can be set continuously on the pressure valve 46. The currently matching provision of the required oil quantity occurs by the pressure-controlled feed pump 32 on the basis of pressure limitation by the pressure valve 46. The supply quantity is thus directly dependent on the opening cross-section of the first and second scavenging valve 21, 21'.

With respect to the second circuit, a quantity of hydraulic oil is supplied as needed in the same way to the third and fourth operating lines 11', 12' by means of the pressure-regulated feed pump 32, wherein oil supply also occurs in this case as needed during the scavenging process.

The operating line 48 of the first feed pump 32 is connected via an oil filter 33 to a first collecting block 34 (distributor) having a first feed line 35 and a second feed line 35', which are connected to the first and second operating line 11, 12 or the third and fourth operating line 11', 12' via a respective check valve 37. The check valves 37 open in the direction towards the first and second operating line 11, 12 and the third and fourth operating line 11', 12'. A line for leakage liquid of the control circuit of the feed pump 32 is designated with reference numeral 41. FIG. 2 further illustrates that a branch line is present in the conveying direction upstream of the feed pump 32. This line is used to branch off hydraulic oil for cross-scavenging the feed pump, which is also returned via the line 41 directly to the tank 14.

The actual value of the feed pressure and a minimum feed pressure, 25 bar in this case, in the two feed lines 35, 35' is determined by means of the pressure sensor 36 which is connected to the output of the oil filter 33 parallel to the first collecting block 34. The pressure sensor 36 is connected on the output side to an input of the control unit ECU, which evaluates it for monitoring and determining the supply as needed.

The first and the second operating pump 10, 10' are cross-scavenged in the present hydraulic system in operation independently of the aforementioned feeding and scavenging process. For this purpose, hydraulic oil is pumped for cooling and/or lubrication purposes through the operating pumps 10, 10', wherein no drive function of the motors 9, 9' is achieved with this process. A cooling and lubricating pump 13 (scavenging pump) which is arranged as a constant pump is provided for filling the housing interior 42, 42' of the first and second operating pump 10, 10' with hydraulic oil, which pump extracts hydraulic oil by suction in an approximately pressure-free manner from the tank 14, and which is connected on the output side via a filter 15 to a second collecting block 16 (distributor). One respective cooling and lubricating line 17, 17' per each closed hydraulic circuit leads to the housing interior 42, 42' from the second collecting block 16 in order to fill, lubricate and cool the housings with oil. The return lines to the third collecting block 28 for hydraulic oil which is taken from the housings of the first and second pump 10, 10' are designated with reference numerals 44, 44'. The housing of each operating pump therefore comprises in total at least five connections: a respective one for each the two operating lines (11, 12 and 11', 12') belonging to the respective closed hydraulic circuit, one for the feed line (35, 35') which opens via a check valve 37 into the first operating line (11, 11') or the second operating line (12, 12'), and a respective one for each the cooling and lubricating line (17, 17') and the associated return line (44, 44') from the housing interior, which are respectively not directly connected to the closed hydraulic system but form an independent cooling and lubrication system.

The collecting tanks 18, 18' of the first and second circuit, which tanks are respectively arranged in the interior of the housing of the motors 9, 9', are connected via first and second return lines 27, 27' to the third collecting block 28 (collector) on the output side, via which the hydraulic oil discharged from the two circuits is supplied together with the hydraulic oil originating from the cross-scavenging process to a return filter 29 with a subsequent oil temperature regulator 30 and a cooler 31, or via a bypass avoiding the cooler 31 to the suction connection of the feed pump 32 via a bypass line 43 and thus to the closed hydraulic circuit. Any excess fluid, which is obtained especially by the quantity of hydraulic oil supplied via the cooling and lubricating pump 13 to the collecting block 28, flows via a pretensioned check valve 52 (pretensioning unit) to the tank 14, and the residual quantity is supplied to the feed pump at the suction connection.

Irrespective of whether the oil conduction occurs via the cooler or the bypass, the oil temperature regulator 30 will thus always control depending on the oil temperature, to the bypass line 43, which conducts the hydraulic oil directly to the first feed pump 32 by circumventing the tank 14.

Further closed hydraulic circuits of the type mentioned above, which are not shown here, may optionally be connected to the first and second collecting block 34, 16 and the third collecting block 28 on the output side.

The functionality of the hydraulic circuit of FIG. 2 is described below. Since the first and the second circuit are identical and therefore operate in the same way, the description is limited to the first circuit with the first hydraulic motor 9.

The first operating pump 10 conveys hydraulic oil in a closed circuit via the first operating line 11 to the first hydraulic motor 9 and drives said motor. The hydraulic oil then flows via the second operating line 12 back to the first operating pump 10. This process can also occur in reverse direction depending on the direction of delivery. The hydraulic oil heats up in this process. In order to prevent a critical increase in the oil temperature, for example, an oil quantity from the low-pressure side is taken in a controlled manner from the first circuit, which is substantially simultaneously replaced by cooled and filtered hydraulic oil. This process is called the scavenging process.

In order to avoid reducing the efficiency of the circuit, the extraction of the hydraulic oil from the low-pressure operating line occurs via the first scavenging valve 21. Depending on the pressure ratio between the first and second operating line 11, 12, the operating line 11, 12 having the lower pressure is connected via the first scavenging valve 21 to the output of the scavenging valve 21. The first pressure-maintaining valve 23 is used to set a minimum pressure in the operating line 11, 12 respectively having the lower pressure.

The extraction quantity is determined quantitatively by the first proportional valve 24, whose proportional magnet is controlled by the control unit ECU and which not only allows discrete switching positions, but also a continuous transition of the valve opening. The quantity of hydraulic oil supplied via the first proportional valve 24 is supplied to the first collecting tank 18 of the first circuit which is formed in the interior of the housing. The control unit ECU cyclically processes a program triggering the first proportional valve 24 in which the detected temperatures on the first hydraulic motor 9, the diesel engine speed n and the requirements for the drive trains are evaluated. The relation between these quantities is either calculated during the running time, or characteristic curves or characteristic maps can be stored in the control unit ECU.

The pressure loss in the closed hydraulic circuit on the low-pressure side by extraction of hydraulic oil via the first proportional valve 24, for example, is compensated as needed by the supply of hydraulic oil by means of the pressure-controlled first feed pump 32 which is arranged as a variable displacement pump. The delivery rate of the feed pump 32 is thus adjusted to the currently required feed oil quantity in the closed hydraulic circuits. Lost output quantities of the feed pump 32 can thus be reduced to a minimum.

At the same time, the scavenging pump 13 conveys a substantially constant oil volume per unit of time. The hydraulic oil is supplied to the pumps 10 and 10' and pumped through their housing, irrespective of the respective operating state. The two pumps are lubricated and cooled in this manner. This process, which is called cross-scavenging, is thus independent of the scavenging process which is controlled as needed.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A method for operating a hydraulic system of a self-propelled road paver, comprising:
    supplying hydraulic oil to a closed hydraulic circuit, wherein at least one hydraulic motor is driven by the hydraulic circuit by at least one operating pump;
    taking a quantity of hydraulic oil in operation per unit of time from the closed hydraulic circuit for cooling and/or filtering purposes; and
    supplying a quantity of hydraulic oil per unit of time back to the hydraulic circuit at another location,
    wherein the supply of hydraulic oil to the closed hydraulic circuit occurs by a feed pump arranged as a variable displacement pump, with a delivery rate of the feed pump being variable and controlled by at least one operating parameter as needed,
    wherein a closed-loop control of the delivery rate of the feed pump occurs on the basis of a pressure of the hydraulic oil in a load signal line and the pressure of the hydraulic oil is for this purpose monitored in this region,
    and further wherein a scavenging circuit is present with a scavenging pump arranged as a constant pump, via which, independently of the closed hydraulic circuit, a continuous scavenging and/or cooling of the at least one operating pump and/or the at least one hydraulic motor occurs for cooling and/or lubricating purposes, which scavenging and/or cooling is independent of the at least one operating parameter.

2. The method according to claim 1,
wherein the quantity of hydraulic oil taken from the closed circuit is controlled depending on at least one operating parameter of the road paver, wherein the at least one operating parameter is currently determined and an actuating quantity for extracting the hydraulic oil is calculated therefrom on the basis of a predetermined algorithm, or that the actuating quantity is determined by a comparison of the currently determined operating parameter with predetermined characteristic quantities.

3. The method according to claim 1,
wherein a division of the hydraulic oil conveyed by the constant pump occurs downstream of the constant pump in the scavenging circuit among operating pumps and/or hydraulic motors of at least two closed hydraulic circuits, wherein hydraulic oil is returned independently thereof in a controlled manner to both closed hydraulic circuits as needed.

4. A hydraulic system of a road paver, comprising:
a closed hydraulic circuit with at least one operating pump and a hydraulic motor which is driven by said pump, wherein a quantity of hydraulic oil is taken from the closed hydraulic circuit in operation per unit of time for cooling and/or filtering purposes, and a quantity of hydraulic oil per unit of time is supplied back at another location, the supply occurring via a feed pump supplied from a tank,
wherein the feed pump is a variable displacement pump with variable delivery rate, with a delivery rate of the feed pump being controlled as required by at least one operating parameter, such that the feed pump supplies hydraulic oil as needed to the hydraulic circuit,
wherein a closed-loop control of the delivery rate of the feed pump occurs on the basis of a pressure of the hydraulic oil in a load signal line and the pressure of the hydraulic oil is for this purpose monitored in this region,
and further wherein the hydraulic system comprises a scavenging pump arranged as a constant pump, which, independently of the feed pump and in a constant manner, conveys hydraulic oil to a scavenging circuit, the scavenging circuit being arranged in such a way that the at least one operating pump and/or the at least one hydraulic motor is scavenged and/or cooled by said scavenging circuit independently of the operation of the feed pump.

5. The hydraulic system according to claim 4,
wherein the closed hydraulic circuit further comprises a scavenging aperture and a pressure-maintaining valve, wherein the scavenging aperture is provided downstream with a proportional valve with a variable valve opening cross-section, which is triggered depending on the operating parameter, so that the valve opening cross-section and thus the quantity of hydraulic oil taken from the circuit and supplied back to the hydraulic oil tank depends on the operating parameter.

6. The hydraulic system according to claim 5,
wherein the proportional valve comprises a control input on the basis of an electrically actuatable magnet, a wax expansion element or a bimetallic element.

7. The hydraulic system according to claim 5,
wherein the proportional valve is triggered by an electronic control unit (ECU), and that the at least one operating parameter is determined by a temperature sensor and/or a pressure sensor.

8. The hydraulic system according to claim 5,
wherein the proportional valve is triggered by an electronic control unit (ECU), and that the at least one operating parameter is derived from a motor controller or a machine controller.

9. The hydraulic system according to claim 4,
wherein a data memory is present in which characteristic quantities of the at least one operating parameter for comparison with the current operating parameter are stored for determining an actuating quantity for the extraction of the hydraulic oil.

10. The hydraulic system according to claim 4,
wherein several closed hydraulic circuits are present, and that each circuit is controlled separately.

11. The hydraulic system according to claim 4,
wherein the supply of hydraulic oil as needed to the several closed hydraulic circuits occurs jointly via the feed pump arranged as a variable displacement pump, wherein a distributor is provided downstream of the feed pump, via which the hydraulic oil is fed to the several closed hydraulic circuits.

12. The hydraulic system according to claim 4,
wherein the feed pump comprises a pressure controller which is arranged for setting the operating pressure of the feed pump at its output within a control range.

13. A road paver having a hydraulic system according to claim 4.

14. The road paver according to claim 13,
wherein at least two closed hydraulic circuits with at least one respective operating pump and at least one respective hydraulic motor are present, wherein a distributor is present downstream of the scavenging pump, which distributor allocates the hydraulic oil conveyed by the scavenging pump in parallel to the at least one respective operating pump and/or the at least one hydraulic motor of the two hydraulic circuits.

15. The road paver according to claim 14,
wherein the several operating pumps are combined as a modular unit and simultaneously comprise separate inputs and outputs for the hydraulic oil conveyed by the scavenging pump for scavenging and/or cooling purposes.

16. The road paver according to claim 4,
further comprising a tamping screed, a right running gear and a left running gear, and that the hydraulic circuit comprises a respective closed hydraulic circuit for driving the tamping screed, the right running gear and the left running gear, and closed hydraulic circuits for the drives of a right and/or left scraper belt, a right and/or left screw conveyor and/or a vibration device.

* * * * *